E. H. CHADDERDON.
WHEEL ATTACHMENT.
APPLICATION FILED DEC. 30, 1919.

1,374,428.

Patented Apr. 12, 1921.

Inventor
E. H. Chadderdon
By Victor J. Evans
Atty.

UNITED STATES PATENT OFFICE.

ELLIS H. CHADDERDON, OF CAMBRIDGE, NEBRASKA.

WHEEL ATTACHMENT.

1,374,428.   Specification of Letters Patent.   Patented Apr. 12, 1921.

Application filed December 30, 1919. Serial No. 348,278.

*To all whom it may concern:*

Be it known that I, ELLIS H. CHADDERDON, a citizen of the United States, residing at Cambridge, in the county of Furnas and State of Nebraska, have invented new and useful Improvements in Wheel Attachments, of which the following is a specification.

This invention comprehends the provision of a wheel attachment, designed to be used on the front wheel of tractors which will cause them to follow a corn ridge.

One of the chief objects of the invention, resides in the provision of an attachment for this purpose made up of separable sections which can be conveniently and readily associated with the wheel or removed therefrom as the occasion requires.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein.

Figure 1:
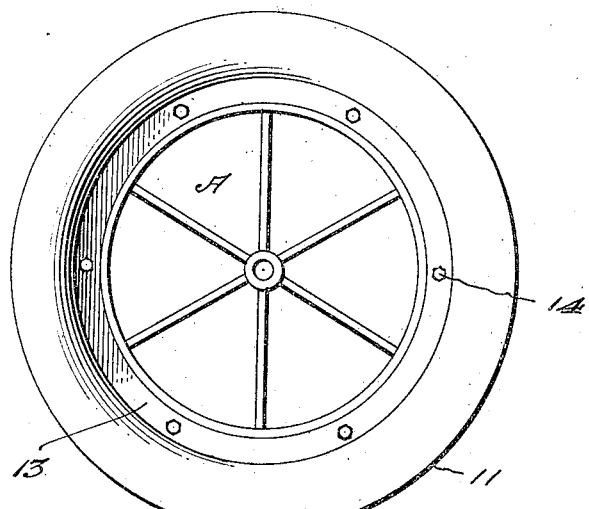
Figure 1 is a view of the attachment associated with a tractor wheel.
Figure 2:
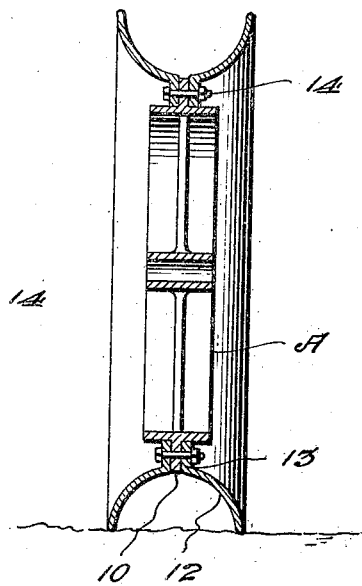
Fig. 2 is a vertical sectional view through the wheel.
Figure 3:
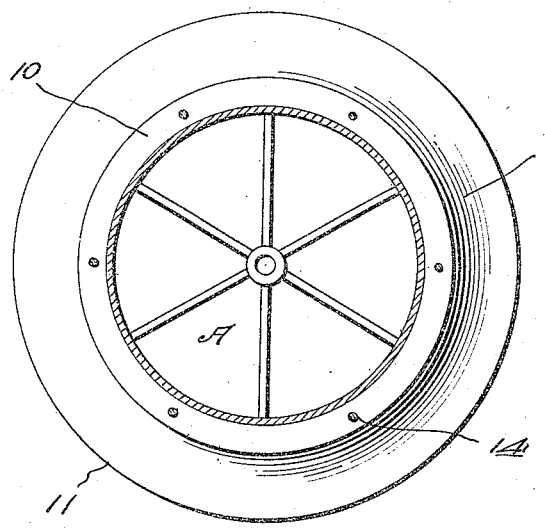
Fig. 3 is a transverse sectional view.

Referring to the drawing in detail A indicates a front wheel of a tractor which is usually provided with a rib or the like 10 which extends around the center of the periphery of the wheel.

Figure 4:
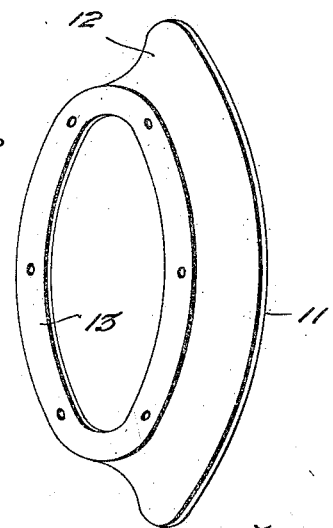
Fig. 4 is a perspective view of one of the sections of the attachment.

The attachment forming the subject matter of my invention comprises two members each of which is identical in construction and corresponding to the disclosure of Fig. 4. Each section is in the form of a disk 11 having a tread portion 12 projecting from one side of the disk and curved in a manner so that when the sections are operatively associated upon the wheel, a concaved periphery is presented. In other words, the tread portions 12 of each disk are curved inwardly and toward each other, and terminate to provide inwardly directed annular flanges 13. These flanges are arranged in parallelism and at opposite sides of the rib 10. Bolts 14 or other suitable fastening elements are utilized in securing the sections 11 of the attachment to the rib 10 of the wheel. By reason of this construction and arrangement of parts it is manifest that the sections 11 can be quickly and easily applied to the wheel or removed therefrom when desired. With the sections associated in the manner shown in Fig. 1, they cause the tractor wheels to follow a corn ridge. This makes tending corn practical, it being understood that the attachment should be only placed on the front wheels of the tractor as the rear wheels will follow any ridge where the front wheels will guide them.

While it is believed that from the foregoing description, the nature and advantages of the invention will be readily understood I desire to make it known that I do not limit myself to the exact details shown, and that such changes may be resorted to when desired as fall within the scope of what is claimed.

Having thus described my invention what I claim as new is:—

1. An attachment for tractor wheels comprising two members arranged at the opposite sides of the wheel, a curved tread portion formed on each member, said curved tread portions being arranged to provide a concaved periphery for the wheel, and means for holding the members together and fixed upon the wheel.

2. A tractor wheel attachment comprising two members arranged at opposite sides of the wheel, each member having curved peripheral portions, said portions unitedly defining a concaved periphery for the wheel, each section or member having a flange, and means for holding the sections together by connecting said flanges.

3. The combination with a tractor wheel having a ridge about the periphery thereof, of a pair of members arranged at opposite sides of the wheel, each member having a curved peripheral portion, said portions unitedly defining a concaved periphery for the wheel, inwardly directed flanges formed on each member, said flanges of the respective members being arranged in parallelism with and at opposite sides of said ridge, and fastening elements passed through said flanges and ridge for holding the parts operatively associated.

In testimony whereof I affix my signature.

ELLIS H. CHADDERDON.